US006435418B1

(12) United States Patent
Toth et al.

(10) Patent No.: US 6,435,418 B1
(45) Date of Patent: Aug. 20, 2002

(54) THERMOSTAT HAVING AN ILLUMINATED KEYPAD AND DISPLAY

(75) Inventors: Bartholomew L. Toth, St. Louis; David L. Perry, Arnold, both of MO (US); William D. Rhodes, Red Bud, IL (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/490,603

(22) Filed: Jan. 25, 2000

(51) Int. Cl.[7] .......................... G05D 23/00; G09G 5/00
(52) U.S. Cl. ...................... 236/94; 165/11.1; 345/170
(58) Field of Search .................. 236/94, 46 R; 165/11.1; 345/170, 172

(56) References Cited

U.S. PATENT DOCUMENTS

| | | | |
|---|---|---|---|
| 3,254,534 A | 6/1966 | Graham | 73/363.7 |
| 4,177,501 A | 12/1979 | Karlin | 362/26 |
| 4,257,555 A | 3/1981 | Neel | 236/94 |
| 4,355,347 A | 10/1982 | Guthrie | 362/30 |
| 4,460,125 A | 7/1984 | Barker et al. | 236/94 |
| 4,930,048 A | 5/1990 | Ito | 362/26 |
| 5,097,396 A | 3/1992 | Myers | 362/32 |
| 5,272,601 A | 12/1993 | McKillip | 362/27 |
| 5,377,027 A | 12/1994 | Jelley et al. | 362/26 |
| 5,482,209 A | 1/1996 | Cochran et al. | 236/46 R |
| 5,567,042 A | 10/1996 | Farchmin et al. | 362/241 |
| 5,746,493 A | 5/1998 | Jönnson et al. | 362/31 |
| 5,747,756 A | 5/1998 | Boedecker | 200/5 A |
| 5,797,482 A | 8/1998 | LaPointe et al. | |
| 5,816,059 A | 10/1998 | Ficchi, Jr. et al. | 62/127 |
| 5,971,557 A | * 10/1999 | Kubes et al. | 362/24 |
| 6,067,074 A | * 5/2000 | Lueders | 345/156 |

* cited by examiner

Primary Examiner—William Wayner
(74) Attorney, Agent, or Firm—Harness, Dickey & Pierce, P.L.C.

(57) ABSTRACT

A thermostat comprising a circuit board for controlling the thermostat, a display, a keypad, and at least one electroluminescent element. The display is operatively connected to the circuit board for displaying information concerning the thermostat. The keypad has at least one key adapted to be pressed by a user. The key is operatively connected to the circuit board in a manner to enable the user to input at least one signal to the circuit board by pressing the key. The electroluminescent element is operatively connected to the circuit board and has a first electroluminescent section and a second electroluminescent section. The first electroluminescent section is adjacent the keypad and the second electroluminescent section is adjacent the display. The first electroluminescent section and the keypad are adapted so that the first electroluminescent section illuminates the keypad. The second electroluminescent section and the display are adapted so that the second electroluminescent section illuminates the display.

15 Claims, 3 Drawing Sheets

THERMOSTAT HAVING AN ILLUMINATED KEYPAD AND DISPLAY

BACKGROUND OF THE INVENTION

This invention relates generally to thermostats having illuminated keypads and displays and more particularly to thermostats having keypads and displays illuminated by electroluminescent elements.

Thermostats are generally attached to walls inside buildings for controlling heating and cooling systems of the buildings. Some thermostats have displays and keypads. The displays are adapted to display information, such as temperature of the room, thermostat settings, time of day, and programming information. The keypad enables a user to input signals to the thermostat to change thermostat settings or to alter the display. Occasionally, the user may desire to change thermostat settings at night. In order to see the keypad, the user must turn on a light in the room, which may be undesirable if another person is sleeping in the room at the time.

SUMMARY OF THE INVENTION

The present invention overcomes the disadvantages of the prior art thermostats. Among the advantages of the present invention may be noted the provision of a thermostat having an illuminated display and an illuminated keypad.

Generally, a thermostat of the present invention comprises a circuit system for controlling the thermostat, a display, a keypad, and at least one electroluminescent element. The display is operatively connected to the circuit system for displaying information concerning the thermostat. The keypad has at least one key adapted to be pressed by a user. The at least one key is operatively connected to the circuit system in a manner to enable the user to input at least one signal to the circuit system by pressing the key. The at least one electroluminescent element is operatively connected to the circuit system and has a first electroluminescent section and a second electroluminescent section. The first electroluminescent section is adjacent the keypad and the second electroluminescent section is adjacent the display. The first electroluminescent section and the keypad are adapted so that the first electroluminescent section illuminates the keypad. The second electroluminescent section and the display are adapted so that the second electroluminescent section illuminates the display.

In another aspect of the present invention, a thermostat of the present invention comprises a circuit board, an electroluminescent element on the circuit board, a keypad member and a display. The circuit board has a plurality of actuable elements thereon. The electroluminescent element has first and second sections, the first section having a plurality of openings therein aligned with the actuable elements on the circuit board. The keypad member overlies the first section of the electroluminescent element. The keypad member has at least one relatively thick portion forming a key aligned with one of the openings in the electroluminescent element. Each key is surrounded by a relatively thin, flexible portion to allow the key to be depressed to actuate an actuable element on the circuit board that is aligned with the same opening in the first section of the electroluminescent element with which the key is aligned. The display overlies the second portion of the electroluminescent element. The electroluminescent element is adapted to illuminate the keypad member and the display.

In another aspect of the present invention, an illuminated thermostat comprises a circuit system for controlling the thermostat, a display, and a keypad. The display is electrically coupled to the circuit system for displaying information concerning the thermostat. The keypad has at least one key adapted to be pressed by a user. The at least one key is operatively connected to the circuit system in a manner to enable the user to input at least one signal to the circuit system by pressing the key. The thermostat further comprises means for illuminating the display and keypad. The illuminating means may comprise one or more electroluminescent elements for illuminating the display and keypad. Alternatively, the illuminating means may comprise an electroluminescent element for illuminating the keypad and some other illuminating mechanism (e.g., a Light Emitting Diode (LED)) for illuminating the display.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
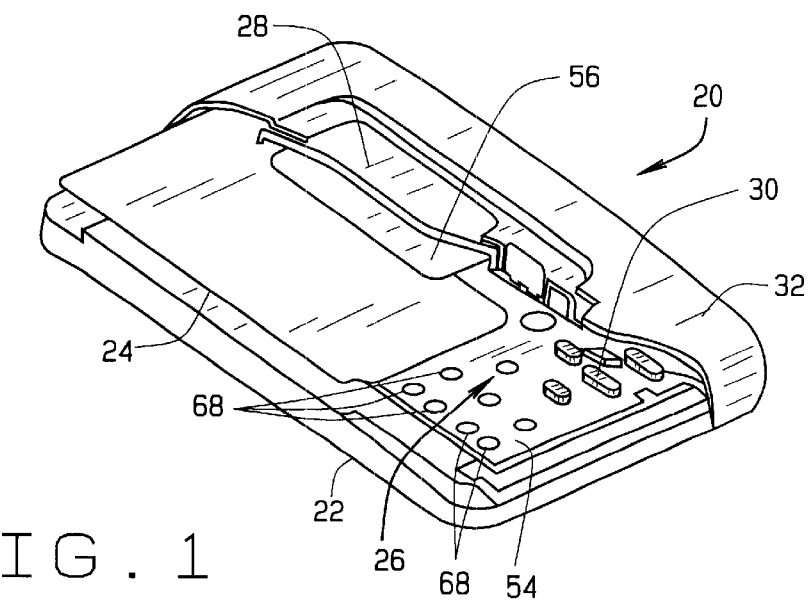
FIG. 1 is a perspective view of a thermostat of the present invention with portions broken away to show detail.
Figure 3:
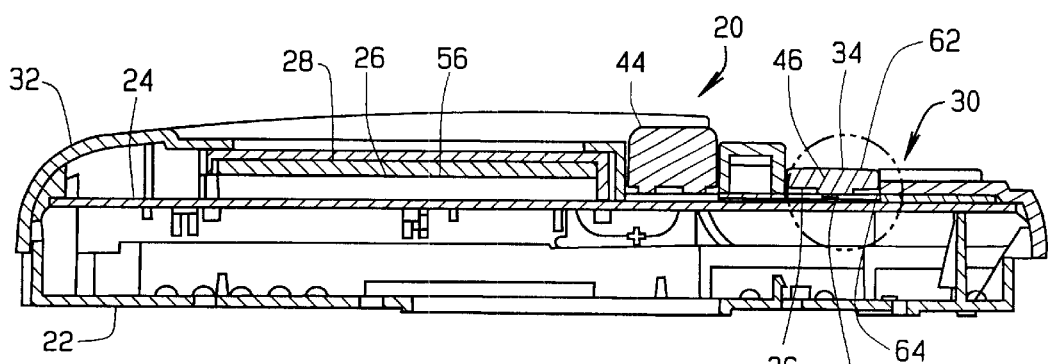
FIG. 3 is a cross-sectional view taken along the plane of line 3—3 of FIG. 2, showing a display, a keypad having a plurality of keys and a circuit board.
Figure 2:
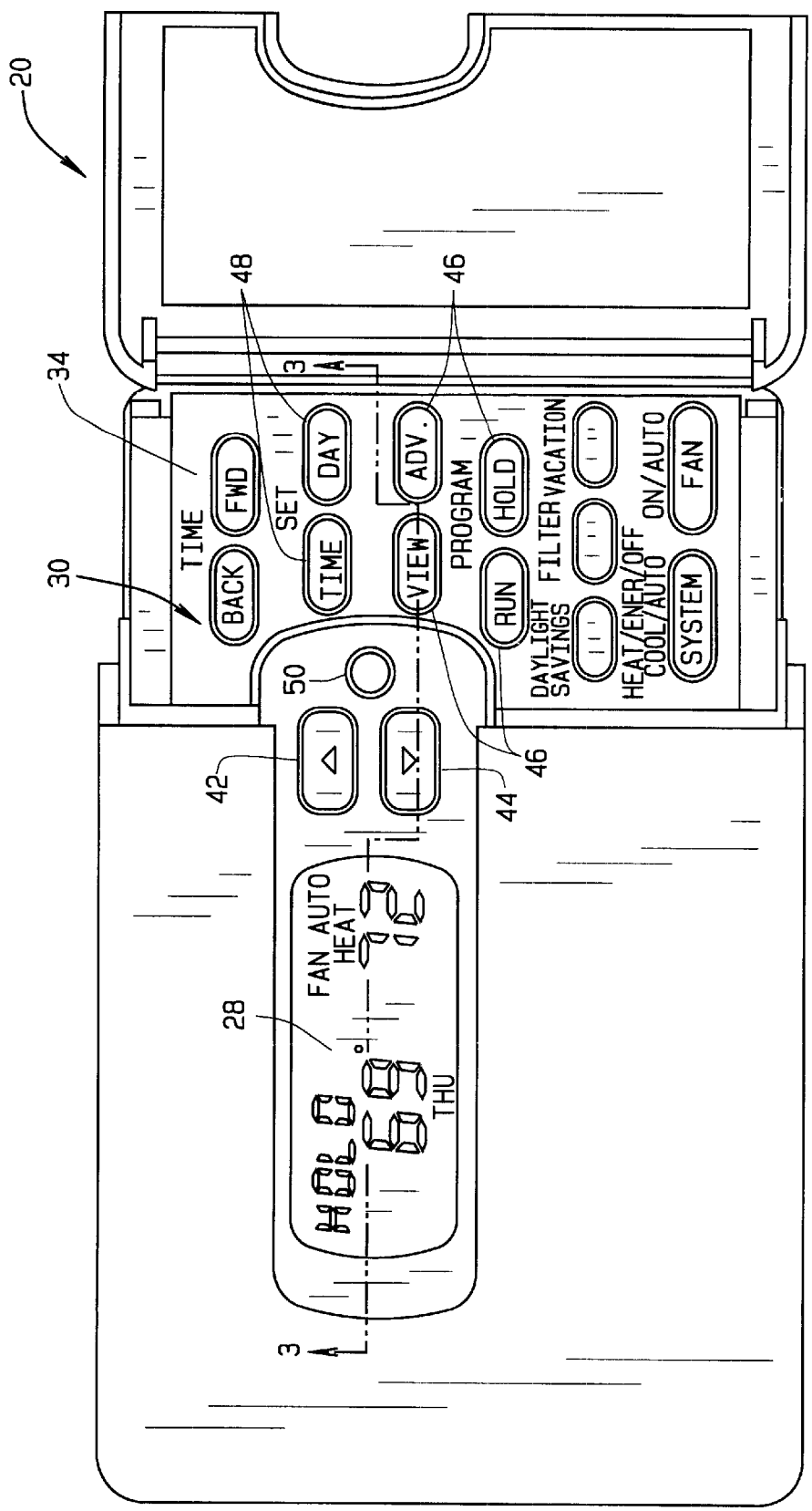
FIG. 2 is a front elevational view of the thermostat of FIG. 1.

Referring now to the drawings and first more particularly to FIGS. 1–3, a thermostat of the present invention is indicated in its entirety by the reference numeral 20. The thermostat 20 is preferably a digital, programmable thermostat for operating a climate control system, and preferably of the type disclosed in U.S. patent application Ser. No. 09/109, 470, filed Jul. 2, 1998 and assigned to Emerson Electric Co. The thermostat 20 includes a wall-mountable base 22, a circuit board 24, an electroluminescent element 26 on the circuit board, a display 28, a keypad 30, and a cover 32. The base 22 is adapted to be secured to a wall (not shown) via screws or other suitable fasteners. The cover 32 is preferably adapted to releasably connect to the base 22 so that the cover and base house the other components of the thermostat 20.

The circuit board 24 may be any circuit board suitable for thermostat control and is preferably a circuit board of the type employed in a Comfort-Set ® III Digital Thermostat, commercially available from Emerson Electric Co., St. Louis, Mo. The display 28 is preferably an LCD display and is electrically coupled to the circuit board 24 for displaying information concerning the thermostat. Preferably, the circuit board 24 is configured to enable the display 28 to display system modes (e.g., heat off, cool auto, hold, programming modes, etc.), warnings (e.g., check battery), setpoint temperature, room temperature, time of day, etc.

The keypad 30 preferably has a plurality of keys adapted to be pressed by a user. The keys are operatively connected to the circuit board 24 in a manner to enable the user to input signals to the circuit board 24 by pressing the keys. The keypad 30 has a front (forward facing) side 34 and a back (rearward facing) side 36 opposite the front side. The front side 34 is adapted to face the user when the user presses the keys of the keypad 30. Preferably, indicia is on the front side 34 of the keypad to identify the keys. The back side 36 of the keypad 30 is preferably face-to-face with the electroluminescent element 26. The keypad and keys are preferably of a material sufficiently light-transmittable to enable visible light from the first electroluminescent section to pass therethrough. The keys may be clear or translucent (i.e., light-transmittable but causing sufficient diffusion to prevent perception of distinct images), but is preferably translucent. Preferably, the keys and keypad are of a polymeric resinous material, and more preferably of a compression moldable silicone such as that commercially available from Shinetsu of Japan, product number 94HB. The keypad 30 preferably includes arrow keys 42, 44 for raising and lowering the temperature settings, program keys 46 for programming the thermostat, and clock keys 48 for setting the date and time. Preferably, the arrow keys 42, 44 are not illuminated. Also preferably, the thermostat 20 includes an LED indicator light 50 which glows when the climate control system is operating.

The electroluminescent element 26 is at least operatively connected to the circuit board 24 and is preferably directly, physically connected to the circuit board. The electroluminescent element 26 includes first and second electroluminescent sections 54, 56. The first electroluminescent section 54 underlies the keypad 30 for illuminating the keypad. The second electroluminescent section 56 underlies the display 28 for illuminating the display. Stated another way, the keypad 30 overlays the first electroluminescent section 54, and the display 28 overlays the second electroluminescent section 56. Preferably, the first electroluminescent section 54 is sandwiched between the keypad 30 and circuit board 24, and the second electroluminescent section 56 is sandwiched between the display 28 and circuit board 24. Preferably, the first electroluminescent section 54 is behind (or adjacent the back side of) every key of the keyboard 30, and the second electroluminescent section 56 is behind the entirety of the display 28. Also preferably, the first and second electroluminescent sections 54, 56 are portions of a single electroluminescent element. However, it is to be understood that two or more electroluminescent elements may also be employed without departing from the scope of this invention.

Figure 4:
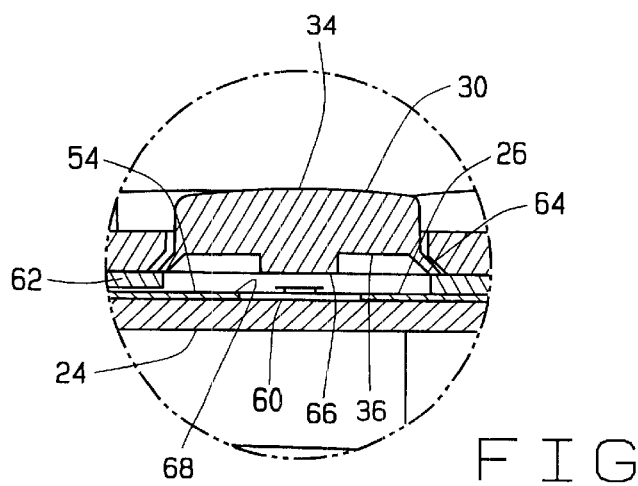
FIG. 4 is an enlarged, fragmented cross-sectional view of one of the keys of the keypad and circuit board of FIG. 3.

The circuit board 24 preferably has a plurality of actuable elements (i.e., elements capable of being actuated) 60 thereon (only one of which is shown in FIG. 4). Each key of the keypad 30 is aligned with and operatively engageable with a corresponding one of the actuable elements 60 of the circuit board 24. The actuable elements 60 of the circuit board 24 are moveable between forward and rearward positions (up and down as shown in FIG. 4) for operating and programming the thermostat. Preferably the actuable elements 60 are biased in their forward positions. The keypad 30 and keys are preferably a single unitary keypad member 62. The keypad member 62 preferably comprises a unitary member having a plurality of relatively thick portions forming the keys (e.g., key 46 in FIG. 4), and a plurality of relatively thin, flexible portions 64 surrounding the keys. The flexible portions 64 allow the keys to move between forward and rearward positions (up and down as shown in FIG. 4) and preferably bias the keys in their forward positions. Preferably, each key includes a rearwardly extending boss (nub) 66 and the first electroluminescent section 54 has a plurality of through openings 68 aligned with the bosses of the keys. Each boss 66 is sized and shaped to extend into a corresponding one of the openings 68 and adapted to engage a corresponding one of the actuable elements 60 of the circuit board 24. The openings 68 permit the bosses 66 of the keys to directly engage the actuable elements 60 as the user depresses the keys to move them from their forward positions to their rearward positions. Thus, the keys and actuable elements are configured and arranged so that depressing the keys actuate the actuable elements 60.

In operation, the electroluminescent element 26 is energized to illuminate the keypad 30 and the display 28. Illuminating the keypad 30 and display 28 enables a user to view and operate the thermostat 20 without the use of external lights.

Figure 5:
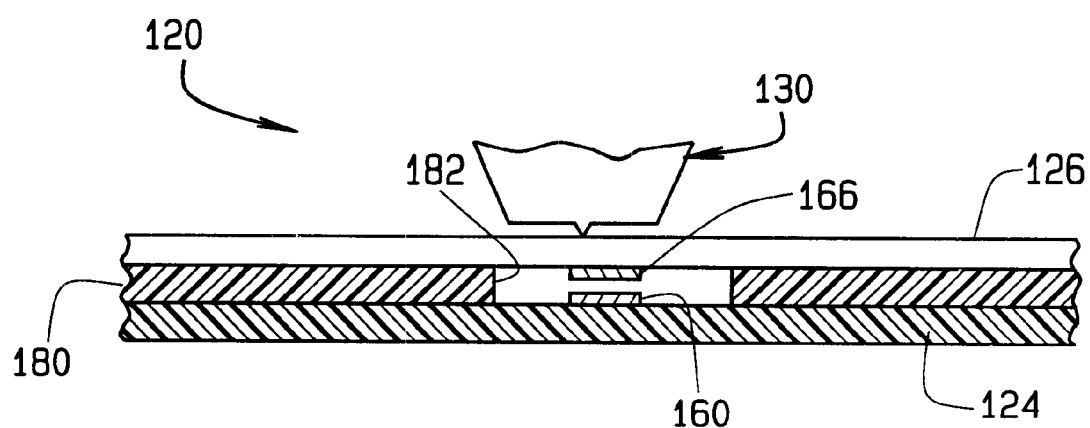
FIG. 5 is an enlarged, fragmented cross-sectional view of a key of a keypad and circuit board of another embodiment of a thermostat of the present invention.

Referring now to FIG. 5, another embodiment of a thermostat of the present invention is indicated in its entirety by the reference number 120. The thermostat 120 of FIG. 5 is identical to the thermostat of FIGS. 1–4 except for the differences noted herein. The thermostat 120 includes a keypad 130 having a plurality of keys (only one of which is shown), an electroluminescent element 126, and a circuit board 124. Unlike the electroluminescent element 26, the electroluminescent element 126 has no openings directly below the keys of the keypad 130. However, the thermostat 120 preferably includes an insulator spacer element 180 sandwiched between the electroluminescent element 126 and the circuit board 124. The spacer element 180 preferably includes a plurality of openings 182 (only one of which is shown) aligned with the keys of the keypad 130. The thermostat 120 further includes a plurality of bosses (or nubs) 166 (only one of which is shown) attached to the underside of the electroluminescent element 126 and aligned with the keys of the keypad 130. The bosses 166 extend into the holes 182 of the spacer element 180, and are aligned with actuable elements 160 of the circuit board 124. Preferably, the actuable elements 160 perform the same function as the actuable elements 60 of the thermostat 20 of FIGS. 1–4. In this embodiment, depressing the key deforms the electroluminescent element 126 to cause the boss 166 to engage the actuable element 160. Preferably, the electroluminescent element 126 and corresponding structure are similar to that described in LaPointe et al. U.S. Pat. No. 5,797,482, incorporated herein by reference.

Although the thermostats of FIGS. 1–5 have been described as illuminating both keypads and displays with electroluminescent elements, it is to be understood that other conventional means may be employed for illuminating the display without departing from the scope of this invention. For example, rather than illuminating the display with the second electroluminescent section, the display could be illuminated with an LED or some other light source electrically coupled to the circuit board.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:
1. An illuminated thermostat comprising:
  a circuit board for controlling the thermostat, the circuit board having at least one actuable element thereon;
  a display electrically coupled to the circuit board for displaying information concerning the thermostat;

a keypad having at least one key adapted to be pressed by a user, the at least one key being aligned with the at least one actuable element of the circuit board, the key being moveable between forward and rearward positions and being operatively connected to the actuable element of the circuit board so that movement of the key from its forward position to its rearward position actuates the actuable element; and at least one electroluminescent element operatively connected to the circuit board, said at least one electroluminescent element having a first electroluminescent and a second electroluminescent section, the first electroluminescent section being adjacent the keyboard, and the second electroluminescent section being adjacent the display, the first electroluminescent section and the keypad being adapted so that the first electroluminescent section illuminates the keypad, the second electroluminescent section and the display being adapted so that the second electroluminescent section illuminates the display, the first electroluminescent section having at least one opening therein, the opening aligned with the at least one actuatable element on the circuit board.

2. An illuminated thermostat as set forth in claim 1 wherein the at least one key of the keypad is of a material sufficiently light-transmittable to enable visible light from the first electroluminescent section to pass through the at least one key.

3. An illuminated thermostat as set forth in claim 2 wherein the material is translucent.

4. An illuminated thermostat as set forth in claim 1 wherein the display overlays the second electroluminescent section.

5. An illuminated thermostat as set forth in claim 4 wherein the display comprises an LCD display.

6. An illuminated thermostat as set forth in claim 1 wherein the first and second electroluminescent sections are portions.

7. An illuminated thermostat as set forth in claim 1 wherein the key constitutes a portion of a keypad member, the keypad member comprising a single unitary member having at least one relatively thick portion forming the key, the key surrounded by a relatively thin, flexible portion to allow the key to be depressed to actuate the actuable element on the circuit board.

8. An illuminated thermostat as set forth in claim 7 wherein the circuit board has a plurality of actuable elements thereon, and wherein the keypad member includes a plurality of relatively thick portions forming a plurality of keys thereon, the keys of the keypad member being aligned with the actuable elements of the circuit board.

9. An illuminated thermostat as set forth in claim 8 wherein the at least one opening in the first electroluminescent section comprises a plurality of openings aligned with the actuable elements of the circuit board, the openings permitting the keys to directly engage the actuable elements as the user depresses the keys.

10. An illuminated thermostat as set forth in claim 8 wherein each key includes a boss thereon extending into one of the openings in the first electroluminescent section and adapted to engage one of the actuable elements of the circuit board.

11. A thermostat having an illuminated keypad and display, the thermostat comprising:

a circuit board having a plurality of actuable elements thereon;

an electroluminescent element on the circuit board, the electroluminescent element having first and second sections, the first section having a plurality of openings therein aligned with the actuable elements on the circuit board;

a keypad member overlying the first section of the electroluminescent element, the keypad member comprising a single unitary member having at least one relatively thick portion forming a key aligned with one of the openings in the electroluminescent element, each key surrounded by a relatively thin, flexible portion to allow the key to be depressed to actuate an actuable element on the circuit board that is aligned with the same opening in the first section of the electroluminescent element with which the key is aligned; and a display overlying the second portion of the electroluminescent element, the electroluminescent element being adapted to illuminate the keypad member and the display.

12. An illuminated thermostat as set forth in claim 11 wherein the at least one key of the keypad member is of a material sufficiently translucent to enable visible light from the first electroluminescent section to pass through the at least one key.

13. An illuminated thermostat as set forth in claim 12 wherein the keypad member includes a plurality of relatively thick portions forming a plurality of keys thereon.

14. An illuminated thermostat as set forth in claim 12 wherein each key includes a boss thereon extending into one of the openings in the first electroluminescent section and adapted to engage one of the actuable elements of the circuit board.

15. An illuminated thermostat comprising:

a circuit board having at least one actuable element thereon;

a keypad having at least one key adapted to be pressed by a user, the at least one key being aligned with the at least one actuable element of the circuit board, so that pressing the key actuates the actuable element;

an electroluminescent element between the keypad and at least a portion of the circuit board for back lighting the keypad, the element having an opening therein aligned with the at least one actuable element on the circuit board and the at least one key on the key pad, operatively connected to the circuit board, and having a the key being moveable between forward and rearward positions and being operatively connected to the actuable element of the circuit board so that movement of the key from its forward position to its rearward position actuates the actuable element; and at least one electroluminescent element operatively connected to the circuit board, said at least one electroluminescent element having at least one opening therein aligned with the actuable element and the at least one key, so that the key can operate the actuable element on the circuit board to operated the thermostat.

* * * * *